(12) United States Patent
Wiedenhoeft

(10) Patent No.: US 12,317,857 B2
(45) Date of Patent: Jun. 3, 2025

(54) PET PERCH

(71) Applicant: Shoulder Cats R Us, LLC, Parker, CO (US)

(72) Inventor: Debra Lynne Wiedenhoeft, Parker, CO (US)

(73) Assignee: Shoulder Cats R Us, LLC, Parker, CO (US)

( * ) Notice: Subject to any disclaimer, the term of this patent is extended or adjusted under 35 U.S.C. 154(b) by 56 days.

(21) Appl. No.: 18/204,561

(22) Filed: Jun. 1, 2023

(65) Prior Publication Data

US 2023/0301270 A1  Sep. 28, 2023

Related U.S. Application Data

(63) Continuation of application No. 16/589,769, filed on Oct. 1, 2019, now Pat. No. 11,707,049, which is a continuation-in-part of application No. 29/642,963, filed on Apr. 3, 2018, now Pat. No. Des. 907,314, which is a continuation of application No. PCT/US2018/025850, filed on Apr. 3, 2018.

(60) Provisional application No. 62/482,372, filed on Apr. 6, 2017.

(51) Int. Cl.
 *A01K 1/02* (2006.01)
 *A45F 3/14* (2006.01)

(52) U.S. Cl.
 CPC .............. *A01K 1/029* (2013.01); *A45F 3/14* (2013.01); *A45F 2003/148* (2013.01)

(58) Field of Classification Search
 CPC .............. A01K 1/029; A45F 2003/144; A45F 2003/148; A45F 3/12; A45F 3/14
 See application file for complete search history.

(56) References Cited

U.S. PATENT DOCUMENTS

| | | | |
|---|---|---|---|
| 2,379,722 A | | 7/1945 | Nathan et al. |
| 2,665,426 A | | 1/1954 | Schmidt |
| 2,778,024 A | | 1/1957 | Randolph |
| 4,097,086 A | * | 6/1978 | Hudson .................. B60N 2/882 |
| | | | 5/636 |
| 4,139,912 A | | 2/1979 | Thuaud |

(Continued)

OTHER PUBLICATIONS

International Preliminary Report on Patentability of PCT/US2018/025850 issued Jul. 10, 2018, 7 pgs.

(Continued)

*Primary Examiner* — Yvonne R Abbott-Lewis
(74) *Attorney, Agent, or Firm* — Polsinelli PC

(57) ABSTRACT

Implementations described and claimed herein provide systems and methods for supporting a pet along trapezii and behind a neck of a user. In one implementation, a core assembly of a bolster has a middle section disposed between a first end section and a second end section, and the middle section positionable behind the neck of the user. An elongated body of the core assembly is positionable along the trapezii of the user in a horizontal orientation. The elongated body extends continuously from the first end to the second end. A padded body of the core assembly extends about the elongated body. A cover is engaged to the core assembly. A securing assembly has a first strap connected to the first end section and a second strap connected to the second end section. The core assembly is releasably securable to the user in the horizontal orientation using the securing assembly.

19 Claims, 13 Drawing Sheets

(56) References Cited

U.S. PATENT DOCUMENTS

| | | | | |
|---|---|---|---|---|
| 4,161,946 A | * | 7/1979 | Zuesse | A61F 5/055 128/DIG. 20 |
| D288,029 S | * | 2/1987 | Parr | D2/823 |
| 4,919,081 A | | 4/1990 | Lewellen | |
| D315,631 S | | 3/1991 | Ragot | |
| 5,277,148 A | | 1/1994 | Rossignol et al. | |
| 5,331,921 A | | 7/1994 | Vanvonno | |
| 5,345,633 A | * | 9/1994 | Harnish | B60N 2/879 5/639 |
| 5,363,803 A | | 11/1994 | Serro | |
| 5,419,281 A | | 5/1995 | Williams et al. | |
| 5,445,302 A | | 8/1995 | Holtorf | |
| 5,465,425 A | * | 11/1995 | Crispin | A41D 13/0012 2/108 |
| D382,091 S | | 8/1997 | Leahy | |
| 5,664,258 A | | 9/1997 | Harris | |
| D398,719 S | | 9/1998 | Ferguson et al. | |
| 5,901,666 A | | 5/1999 | Belisle | |
| 5,918,332 A | * | 7/1999 | Dees | A47G 9/1045 5/639 |
| 6,079,055 A | * | 6/2000 | Mencel | A41D 13/0512 2/310 |
| 6,209,134 B1 | | 4/2001 | Schiesel | |
| 6,231,535 B1 | * | 5/2001 | Mainiero | A61F 5/055 5/636 |
| D445,506 S | * | 7/2001 | Vinson | D24/183 |
| 6,450,126 B1 | * | 9/2002 | Schellenbach | A01K 1/029 119/714 |
| 6,484,335 B2 | * | 11/2002 | Gilbert | A47C 7/425 5/639 |
| 6,484,337 B1 | * | 11/2002 | Moe | A47C 7/021 5/655 |
| 6,641,221 B1 | * | 11/2003 | Kastlunger | A47D 15/006 5/636 |
| 6,701,871 B1 | | 3/2004 | Johnson | |
| 6,748,615 B1 | * | 6/2004 | Tiedemann | A47C 7/383 5/636 |
| 6,860,237 B1 | | 3/2005 | Rohlfing | |
| D510,463 S | | 10/2005 | Goforth et al. | |
| 6,957,462 B1 | * | 10/2005 | Wilcox | A47C 7/383 5/636 |
| D522,300 S | * | 6/2006 | Roberts | A47C 7/383 D6/601 |
| 7,082,617 B1 | | 8/2006 | Poindexter et al. | |
| 7,117,824 B2 | | 10/2006 | Holtzworth et al. | |
| D571,538 S | | 6/2008 | Wolters | |
| 7,441,292 B2 | * | 10/2008 | Williams | A45F 4/02 5/636 |
| D591,484 S | | 5/2009 | Lindh | |
| 7,587,773 B2 | * | 9/2009 | Littlehorn | A47C 20/025 5/655 |
| D603,139 S | | 11/2009 | Martin | |
| D614,901 S | * | 5/2010 | Welch | D6/601 |
| 7,722,122 B2 | * | 5/2010 | Mittelstadt | B60N 2/885 5/640 |
| 7,758,125 B2 | * | 7/2010 | Mittelstadt | A47C 7/383 5/640 |
| D625,903 S | | 10/2010 | Conley | |
| D629,178 S | | 12/2010 | Lindsay | |
| D632,873 S | | 2/2011 | Garibay | |
| D675,381 S | | 1/2013 | Rambo | |
| 8,662,590 B2 | * | 3/2014 | Bogen | A47C 7/383 297/393 |
| 8,708,416 B2 | * | 4/2014 | Stronconi | A47C 7/383 297/397 |
| 8,813,283 B2 | * | 8/2014 | Alexander | A47G 9/1081 5/636 |
| 8,973,163 B1 | | 3/2015 | Kuever et al. | |
| D746,080 S | * | 12/2015 | Mittelstadt | D6/601 |
| D767,825 S | | 9/2016 | Georgeson et al. | |
| 10,085,497 B2 | | 10/2018 | Douglas et al. | |
| D836,251 S | | 12/2018 | Bynoe | |
| D907,314 S | * | 1/2021 | Wiedenhoeft | A45F 3/14 D30/199 |
| D920,008 S | * | 5/2021 | Lopez | D6/609 |
| D937,009 S | * | 11/2021 | Wen | D6/601 |
| 11,297,961 B2 | * | 4/2022 | Lowry | A47G 9/1027 |
| 11,457,754 B1 | * | 10/2022 | Adelipour | A47G 9/1081 |
| 2002/0188998 A1 | | 12/2002 | Yost | |
| 2005/0039702 A1 | | 2/2005 | Laffoon | |
| 2007/0193528 A1 | | 8/2007 | Scaife | |
| 2015/0351564 A1 | | 12/2015 | Vogel | |
| 2017/0172102 A1 | | 6/2017 | Rivera | |
| 2020/0282284 A1 | | 9/2020 | Searcy | |

OTHER PUBLICATIONS

International Search Report of PCT/US2018/025850 issued Jul. 10, 2018, 2 pgs.

Written Opinion of PCT/US2018/025850 issued Jul. 10, 2018, 6 pgs.

\* cited by examiner

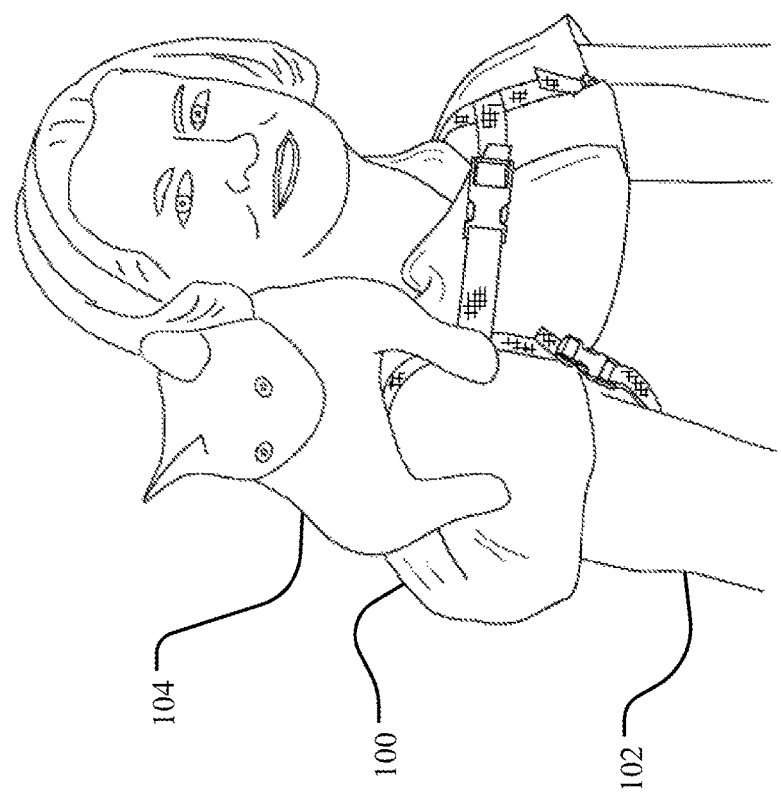
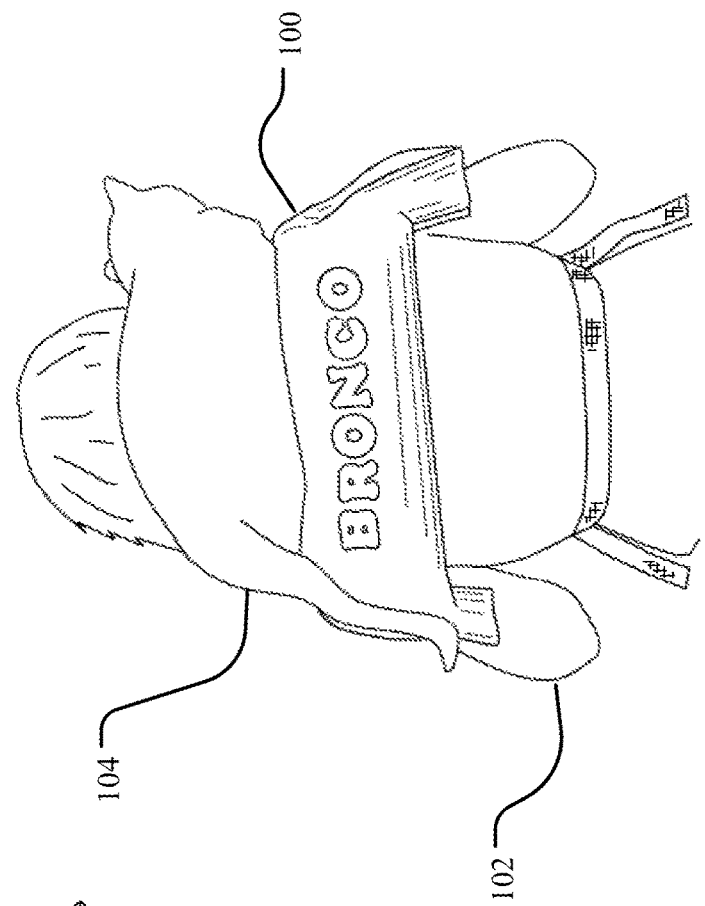
FIG. 1A
FIG. 1B

PET PERCH

CROSS-REFERENCE TO RELATED APPLICATIONS

The present application is a continuation of and claims priority to U.S. patent application Ser. No. 16/589,769, entitled "Pet Perch" and filed on Oct. 1, 2019, which is a continuation-in-part of and claims priority to U.S. Design application No. 29/642,963, entitled "Pet Perch" and filed on Apr. 3, 2018, which is a continuation of PCT Application No. PCT/US2018/025850, entitled "Pet Perch" and filed on Apr. 3, 2018, which claims priority to U.S. Provisional Patent Application No. 62/482,372, entitled "Shoulder Cat Pet Perch" and filed on Apr. 6, 2017. Each of these applications is incorporated by reference in its entirety herein.

FIELD

Aspects of the present disclosure relate generally to pet carriers and more particularly to systems and methods for supporting a pet along the trapezii of a user during transport, rest, activities, and/or the like.

BACKGROUND

Globally, the majority of consumers own one or more household pets. Over the years, pets have evolved to become an integral part of families. Some pets enjoy interaction with their owners to the extent that the pet consistently insists on sitting on the shoulders of the owner. Trying to balance the pet on the shoulders can provide uncomfortable and challenging for the owner, however, particularly after long periods of time. For example, the posture of the owner is often compromised by attempting to keep the pet balanced, and the claws of the pet may dig into the owner in this position. These difficulties are exacerbated when the owner attempts to engage in movement or activities, such as chores, routine activities around the house, and/or the like.

It is with these observations in mind, among others, that various aspects of the present disclosure were conceived and developed.

SUMMARY

Implementations described and claimed herein address the foregoing problems by providing systems and methods for supporting a pet along trapezii and behind a neck of a user. In one implementation, a bolster extends between a first end and a second end. The bolster has a front side disposed opposite a back side and a top side disposed opposite a bottom side. A core assembly of the bolster has a middle section disposed between a first end section and a second end section, and the middle section positionable behind the neck of the user. An elongated body of the core assembly is positionable along the trapezii of the user in a horizontal orientation. The elongated body extends continuously from the first end to the second end. A padded body of the core assembly extends about the elongated body. A cover has a first side and a second side, and the cover is engaged to the core assembly. A securing assembly has a first strap connected to the first end section and a second strap connected to the second end section. The core assembly is releasably securable to the user in the horizontal orientation using the securing assembly.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIGS. 1A and 1B illustrate a perspective view and a back view, respectively, of a user wearing an example perch to support a pet.

DETAILED DESCRIPTION

Figure 2:
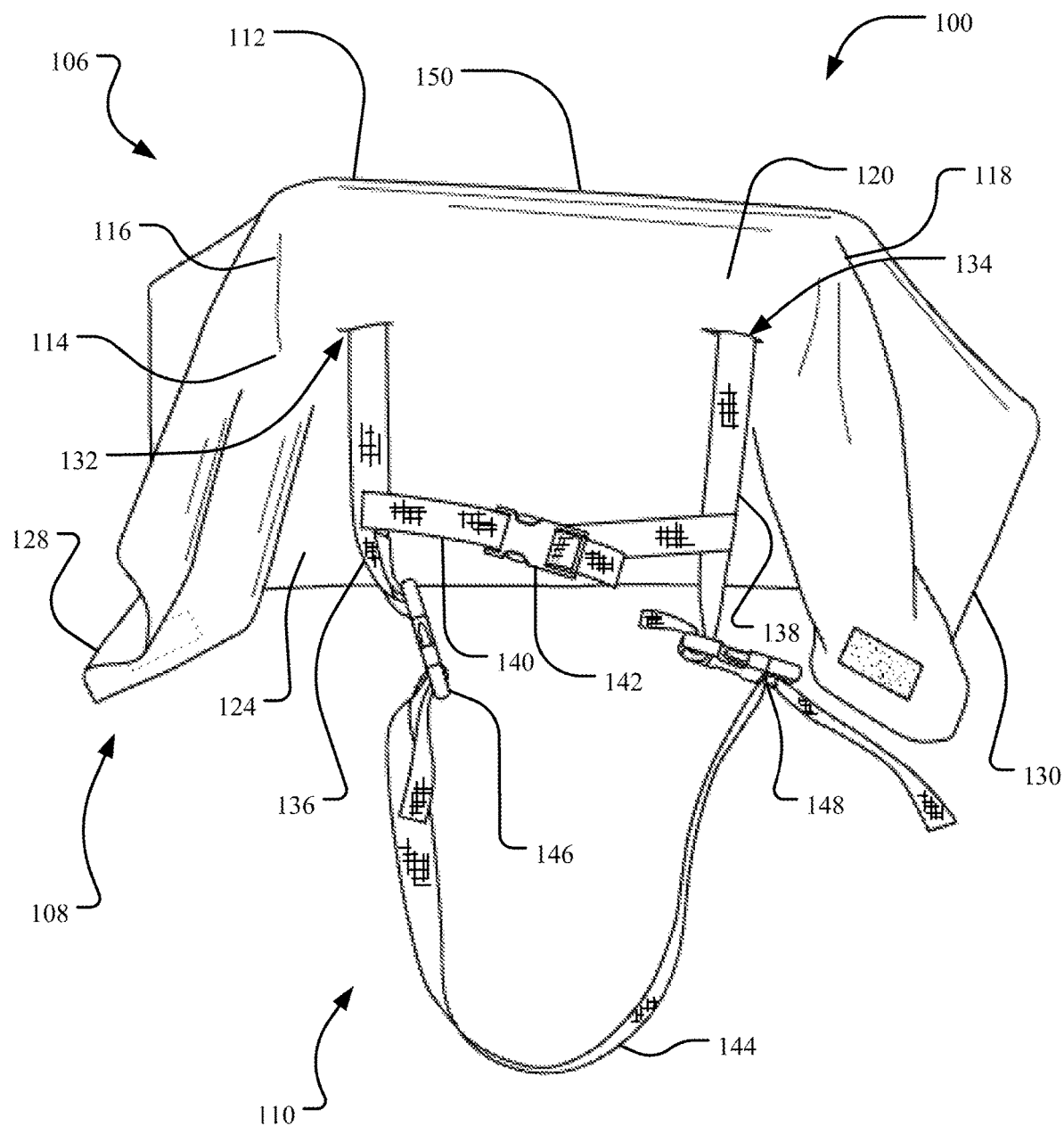
FIG. 2 shows a front view of the perch.
Figure 3:
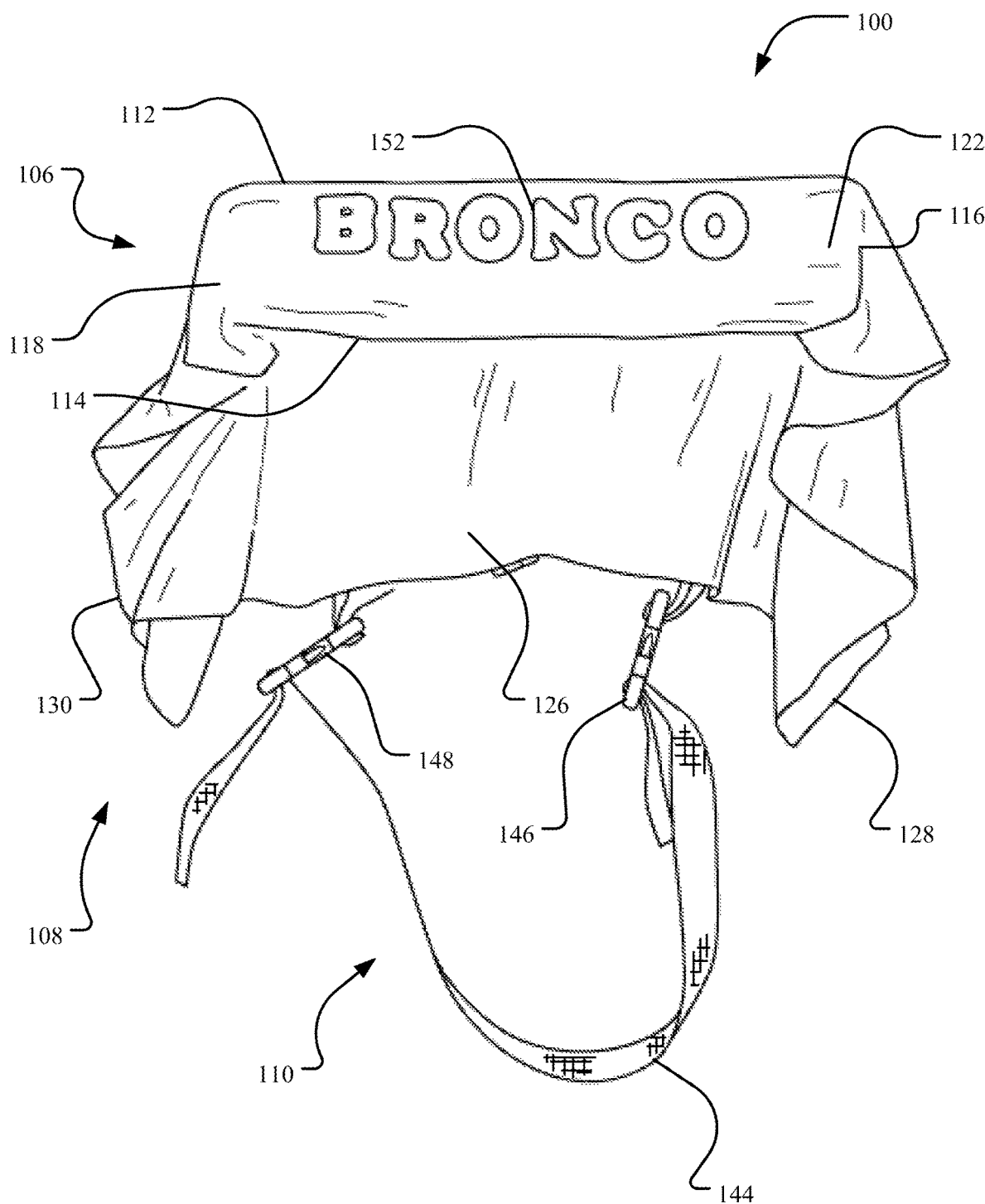
FIG. 3 is a back view of the perch.
Figure 4:
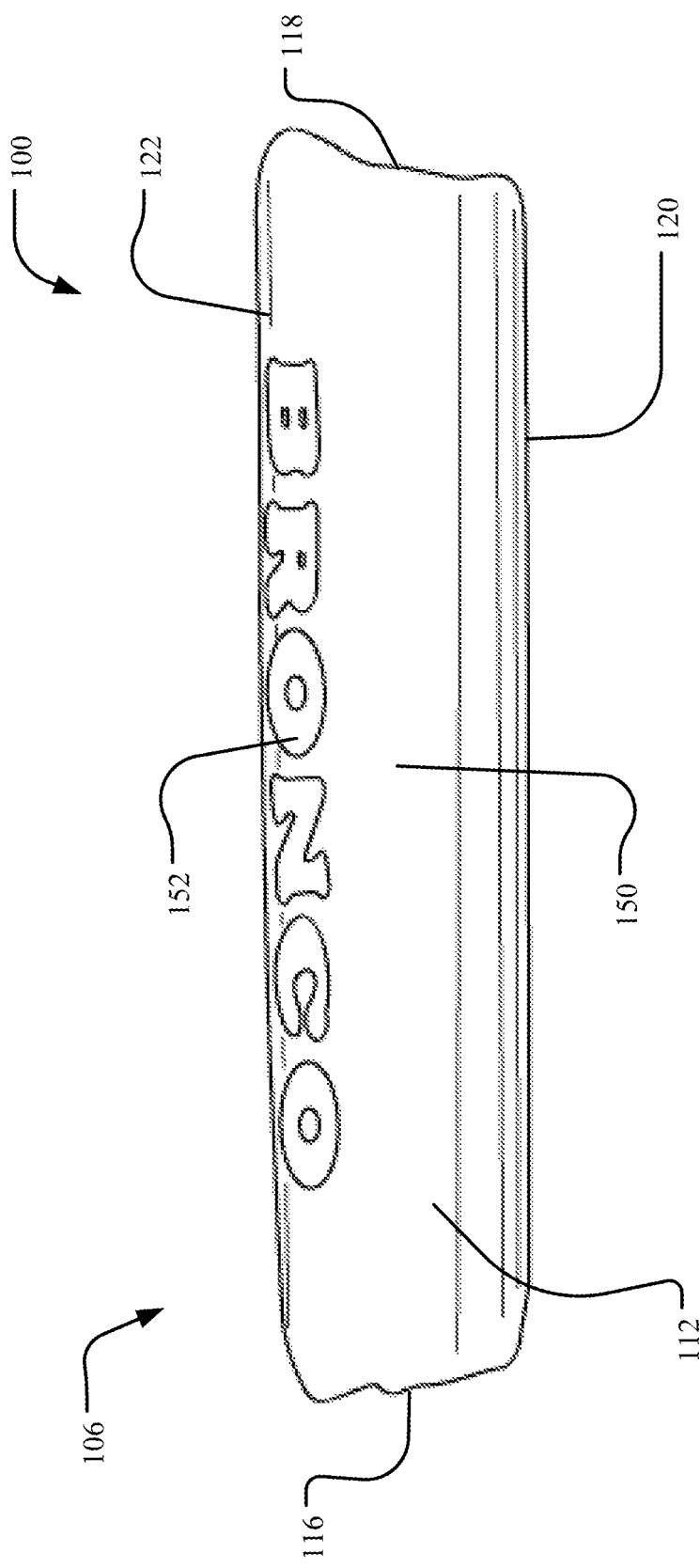
FIG. 4 depicts a top view of the perch.
Figure 5:
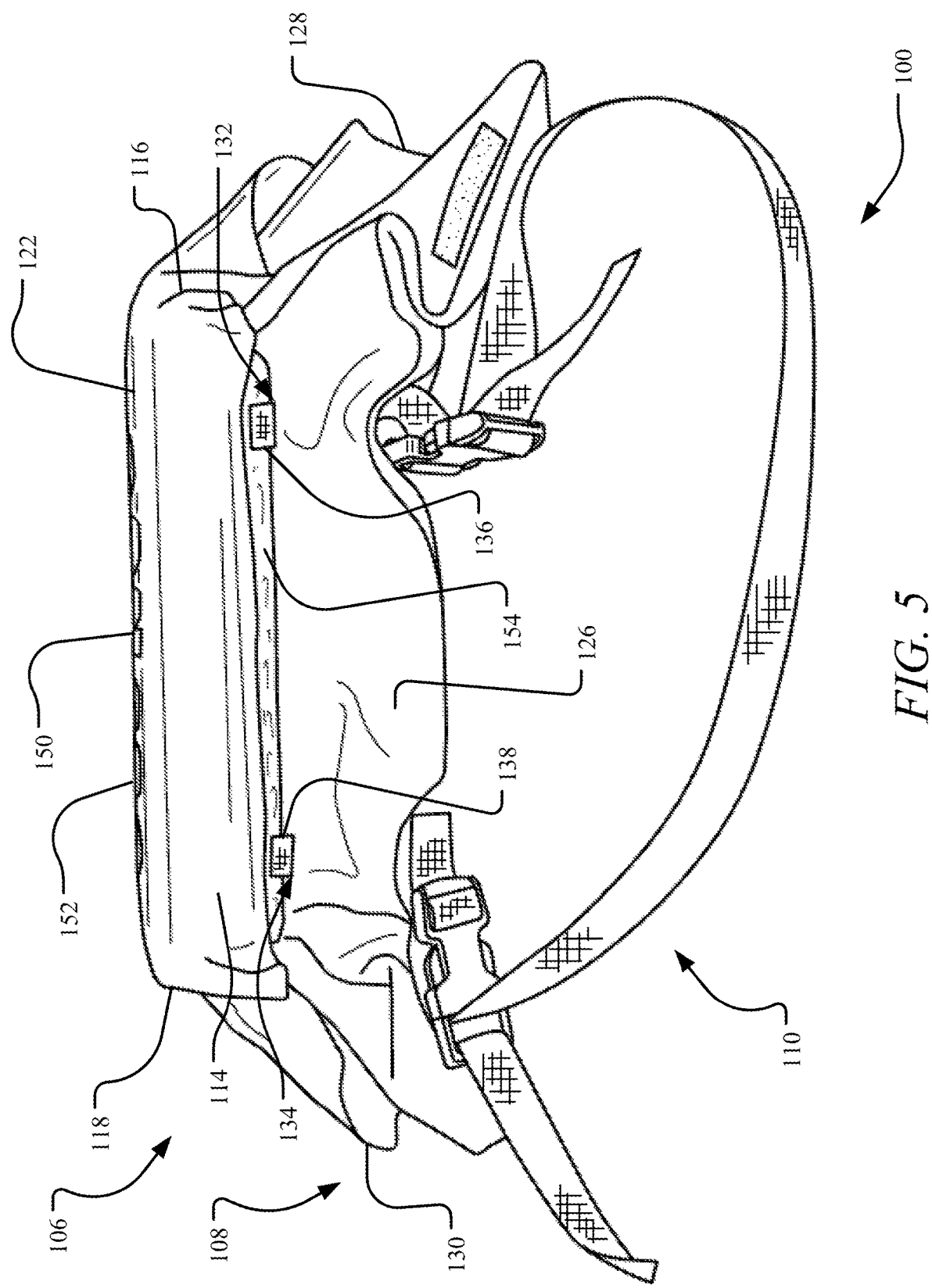
FIG. 5 shows a bottom perspective view of the perch.
Figure 6:
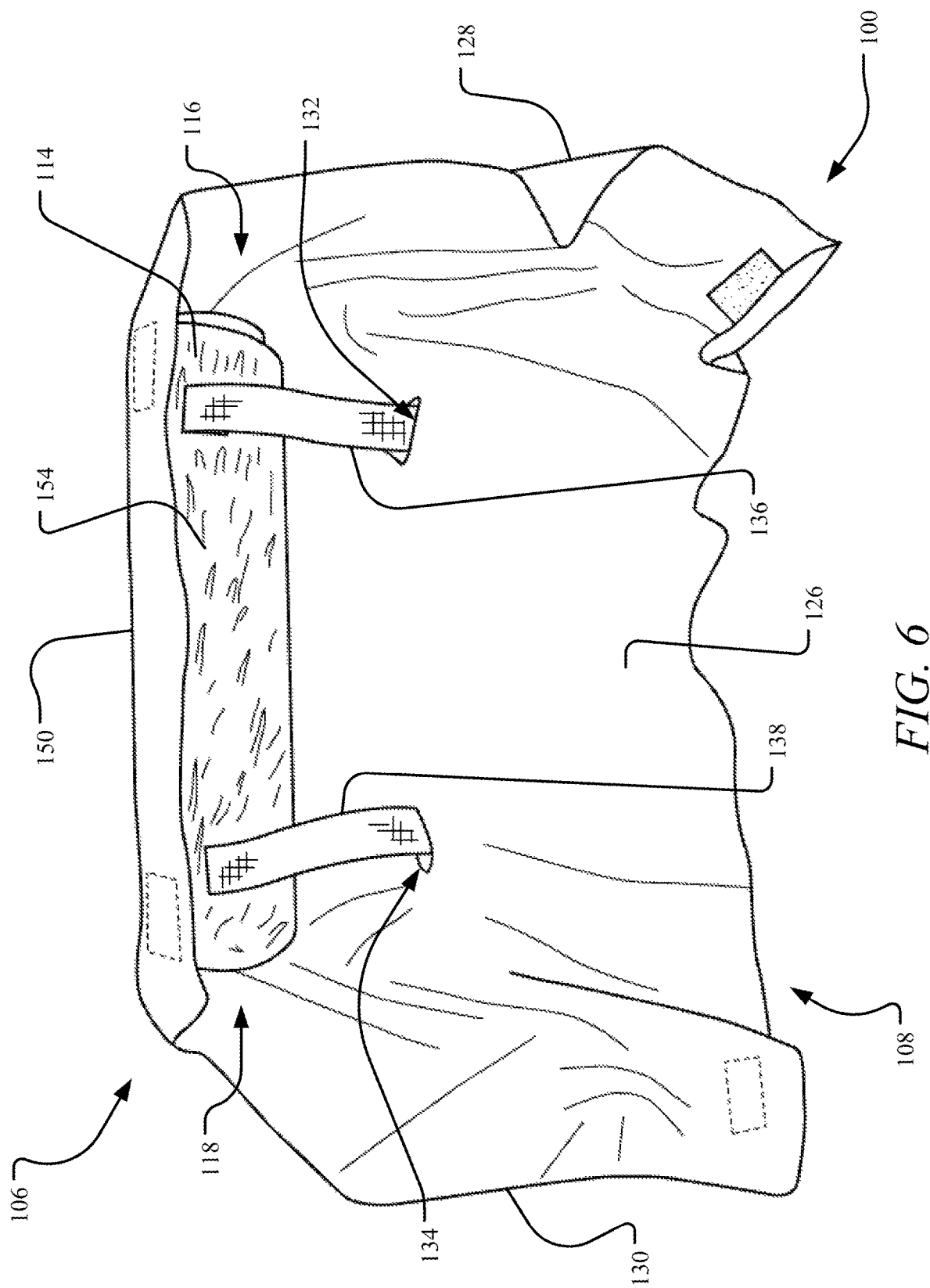
FIG. 6 is a bottom perspective view of the perch showing a core assembly.

Aspects of the presently disclosed technology relate to systems and methods for supporting a pet. In one aspect, a perch includes a bolster positioned in a horizontal orientation extending along the trapezii of a user. For example, the bolster may extend between the shoulders of the user behind the neck. A securing assembly releasably secures the bolster to the user and maintains the bolster in the horizontal orientation. The bolster forms a seat for a pet to use and evenly distributes a weight of the pet across the trapezii of the user. The maintenance of the bolster in the horizontal orientation permits the user to: perform various activities unrestricted, provide hands-free transport and support of the pet, and maintain proper posture, among other benefits. Further, the bolster provides an unrestricted seat, such that the pet may sit, turn, move, leave, and/or the like, as desired and without assistance from or involvement by the user. A cover may further be connected to the bolster, providing protection to the body of the user and the clothes of the user from sharp anatomy of the pet, as well as from debris. As such, the perch provides a safe location for the pet to interact with a user without restricting, discomforting, or inconveniencing the user or the pet.

To begin a detailed description of an example perch 100, reference is made to FIG. 1. In one implementation, the perch 100 is releasably secured to a user 102 in a horizontal orientation, forming a seat for one or more pets 104 to use. The pet(s) 104 may include, without limitation, one or more felines, canines, rabbits, rodents, reptiles, amphibians, and/or other animals. The perch 100 positions the pet 104 on the shoulders of the user 102 near the head, where many animals desire to sit for interacting with the user 102, removing themselves from their environment (e.g., in the presence of other animals with which they do not wish to interact), and resting. The seat formed by the perch 100 is unrestricted, such that the pet 104 may lay, sit, turn, arrive, leave, and/or otherwise move, as desired and without assistance from or involvement by the user 102.

In addition to providing a safe, unrestricted, and comfortable seat for the pet 104, the perch 100 optimizes comfort without hindering movement by the user 102. More particularly, the perch 100 distributes a weight of the pet 104 evenly across the trapezii of the user 102, such that the pet 104 is supported without sacrificing the posture of the user 102, particularly over extended periods of time. The perch 100 provides hands-free support of the pet 104, enabling the user 102 to perform various activities and move unrestricted. In one implementation, the perch 100 further protects the skin, clothes, and accessories of the user 102 from sharp anatomy of the pet 102, such as claws, nails, scales, teeth, and/or the like, as well as from debris, including dander, shedding, dirt, and bodily fluids.

All or a portion of the perch 100 may be disassembled to facilitate cleaning or interchanging of various components. Additionally, the perch 100 may be customizable in size and/or shape to accommodate different sizes of the pet 104 or the user 102. The perch 100 may further facilitate customization of aesthetic content. For example, content, such as the name of the pet 104, a description of a role of the pet 104 (e.g., "Therapy Animal"), the name of the user 102, and other words, phrases, names, designs, etc., may be displayed with the perch 100. Additionally, the perch 100 may incorporate various interchangeable colors, designs, patterns, graphics, and/or the like.

Turning to FIGS. 2-6, in one implementation, the perch 100 includes a bolster 106 connected to a cover 108 and a securing assembly 110. The bolster 106 may be releasably connected or fixed to the cover 108 and/or the securing assembly 110. The bolster 106 extends from a first end 116 to a second end 118 along a longitudinal axis. The bolster 106 includes a front side 120 disposed opposite a back side 122 and a top side 112 disposed opposite a bottom side 114.

In one implementation, the bolster 106 includes a core assembly 154 having a middle end section 150 disposed between a first end section and a second end section. Stated differently, the core assembly 154 includes the first end section extending from the first end 116 to the middle section 150 and the second end section extending from the second end 118 to the middle section 150. In one implementation, when the perch 100 is positioned in the horizontal orientation, the bolster 106 extends along the trapezii of the user 102 with the middle section 150 of the core assembly 154 disposed behind the neck of the user 102. In the horizontal orientation, the top side 112 of the core assembly 154 of the bolster 106 forms the seat for the pet 104.

The core assembly 154 of the bolster 106 may be releasably connected (e.g., via one or more sets of paired hook and loop fasteners, pins, snaps, etc.) or fixed to the cover 108 (e.g., via sewing, adhesives, etc.). For example, the cover 108 may be removable from the core assembly 154 for cleaning or interchanging with another cover. The cover 108 may have a variety of colors, patterns, designs, graphics, and/or other aesthetic features. For example, the cover 108 may include content 152, such as names, words, phrases, designs, logos, graphics, and/or the like. In one implementation, the content 152 is displayable on the cover 108 at the back side 122 of the bolster 106. However, other locations for displaying content are contemplated. The cover 108 may be made from a variety of materials adapted to resist penetration by sharp anatomy of the pet 104 and to otherwise protect the skin, clothes, and accessories of the user 102. For example, the cover 108 may be made from fabric, leather, fur, plastic, rubber, and/or other synthetic or natural materials.

In one implementation, the cover 108 includes a first side 124 and a second side 126. The cover 108 may be connected to the core assembly 154, for example, at the bottom side 114, and wrapped about the core assembly 154, forming a wrapped section and a draped section. The wrapped section includes the portion of the cover 108 wrapping about the core assembly 154, and the draped section includes the portion of the cover 108 hanging distally from the core assembly 154. In one implementation, the wrapped section includes the second side 126 facing inwardly towards the core assembly 154 and the first side 124 facing outwardly from the core assembly 154. The second side 126 may include one or more strips of material or other mechanical components for releasably connecting to the core assembly 154.

The draped section of the cover 108 may include a first wing 128 and a second wing 130 connected by a middle drape. In one implementation, the first wing 128 includes a first collection of material of the cover 108 extending and hanging from the first end 116 of the bolster 106, and the second wing 130 includes a second collection of material of the cover 108 extending and hanging from the second end 118 of the bolster 106. The middle drape may include the first side 124 of the cover 108 facing in a direction towards the user 102 and the second side 126 facing in a direction away from the user 102.

The cover 108 may accommodate a connection of the core assembly 154 to the securing assembly 110. For example, the cover 108 includes a first opening 132 and a second opening 134 to accommodate one or more portions of the securing assembly 110. In one implementation, the securing assembly 110 includes a first strap 136 and a second strap 138. The first strap 136 may be separate from, connectable to, and/or integral with the second strap 138. In one implementation, the first strap 136 is releasably connected to the second strap 138 via a proximal strap 140 having a releasable connection 142, such as a buckle. In another implementation, the first strap 136 and the second strap 138 form a single strap. A distal strap 144 may be releasably connected to the first strap 136 and the second strap 138 via releasable connections 146 and 148, respectively.

The first strap 136 may extend through the first opening 132 and connect to the core assembly 154, and the second strap 138 may extend through the second opening 134 and connect to the core assembly 154. In one implementation, the first strap 136 is connected to the core assembly 154 at the first end section, and the second strap 138 is connected to the core assembly 154 at the second end section. The first strap 136 and the second strap 138 may each be connected to the core assembly 154 at the bottom side 114 of the bolster 106.

Figure 7:
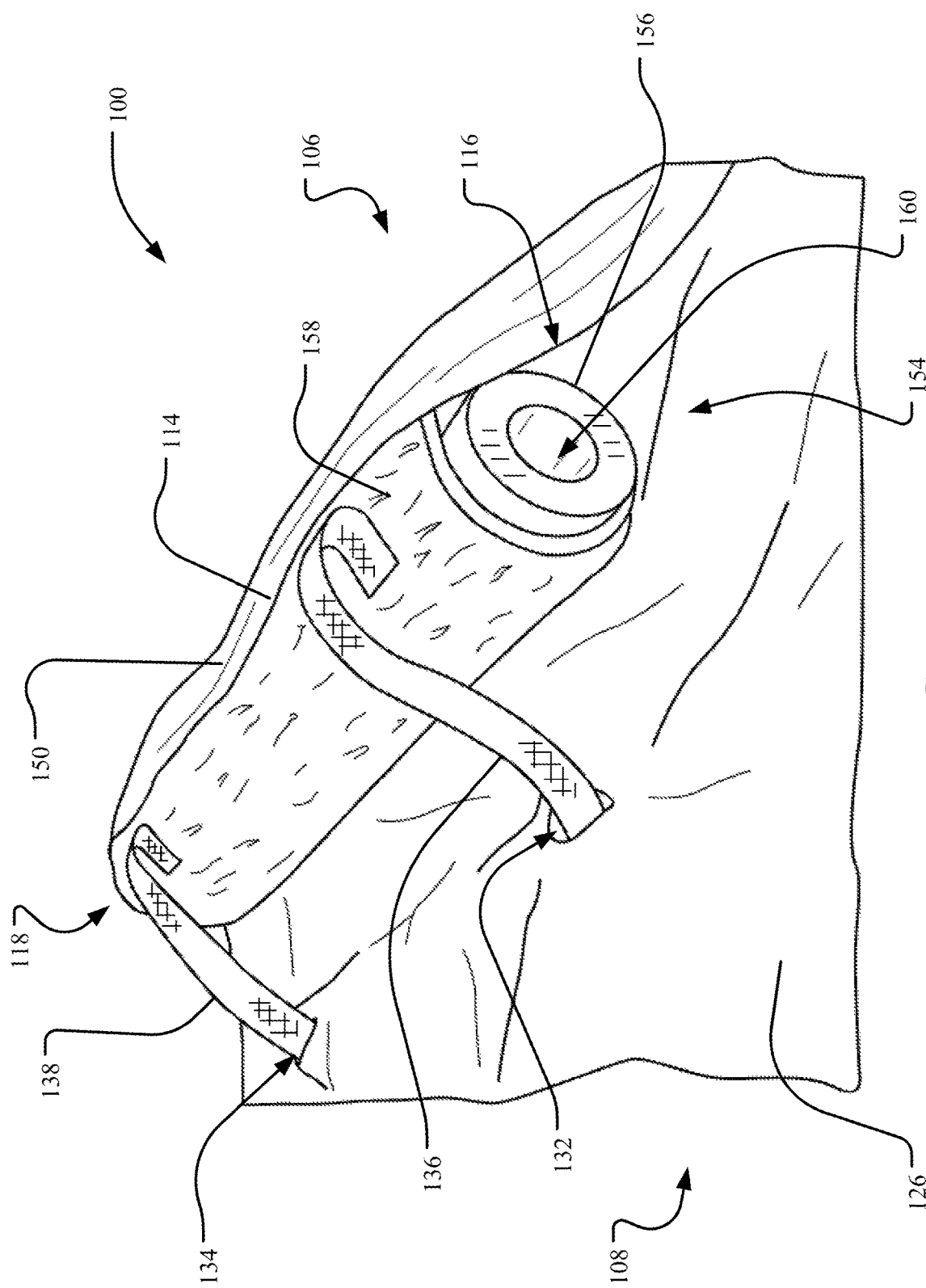
FIG. 7 illustrates a side perspective view of the perch showing the core assembly.
Figure 8:
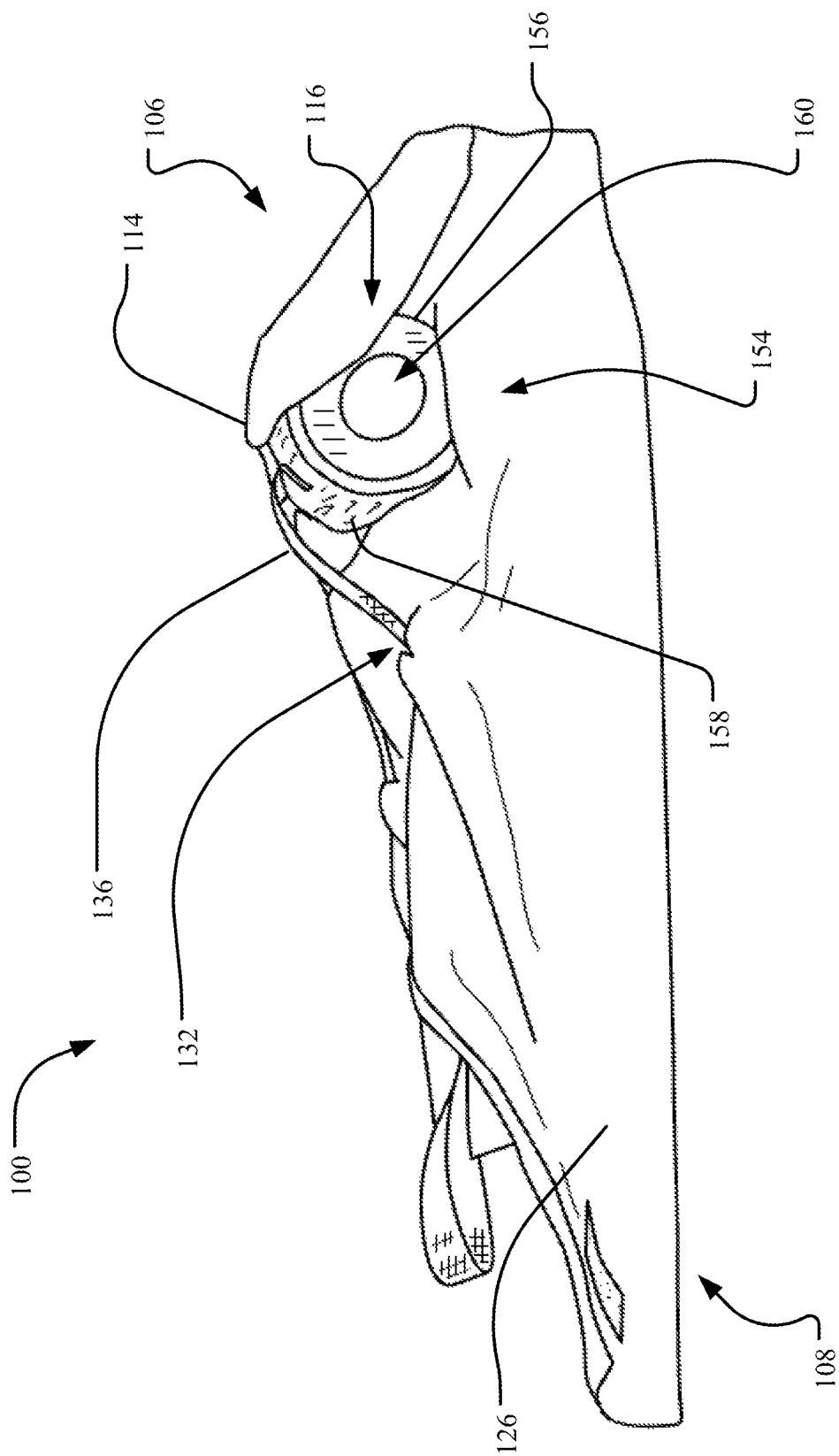
FIG. 8 shows a side view of the perch showing the core assembly.

As can be understood from FIGS. 7-8, in one implementation, the core assembly 154 includes an elongated body 156 extending between the first end 116 and the second end 118. The elongated body 156 may extend continuously between the first end 116 and the second end 118 as an integral piece or be broken into separate pieces. The elongated body 156 may have a variety of shapes and sizes. For example, the elongated body 156 may be cylindrical, conical, cubical, polygonal, pyramidal, ellipsoidal, spherical, curved, angled, flat, and/or the like. In one implementation, the first section, the second section, and the middle section 150 of the elongated body 156 each have the same cross-sectional shape. The elongated body 156 may be made from a variety of materials, including foam (e.g., polyethylene foam), plastic, rubber, fabric, and/or other lightweight and rigid materials. The elongated body 156 is adapted to flex and absorb force while evenly distributing a weight of the pet 104 across the trapezii of the user 102 to maximize comfort. A lumen 160 may extend through the elongated body 156 to further decrease weight.

In one implementation, the core assembly 154 includes a padded body 158 extending about the elongated body 156. The padded body 158 may be integral with the elongated body 156 or be separate from the elongated body 156, such that the padded body 158 extends about a surface of the elongated body 156. The padded body 158 may include an inner surface and an outer surface. The inner surface may be positioned adjacent to an outer surface of the elongated body 156. The inner surface may be fixed to or loose from the elongated body 156. The outer surface of the padded body 158 may include one or more releasable or fixed connection points for connecting to the cover 108 and/or the straps 136 and 138.

Figure 9:
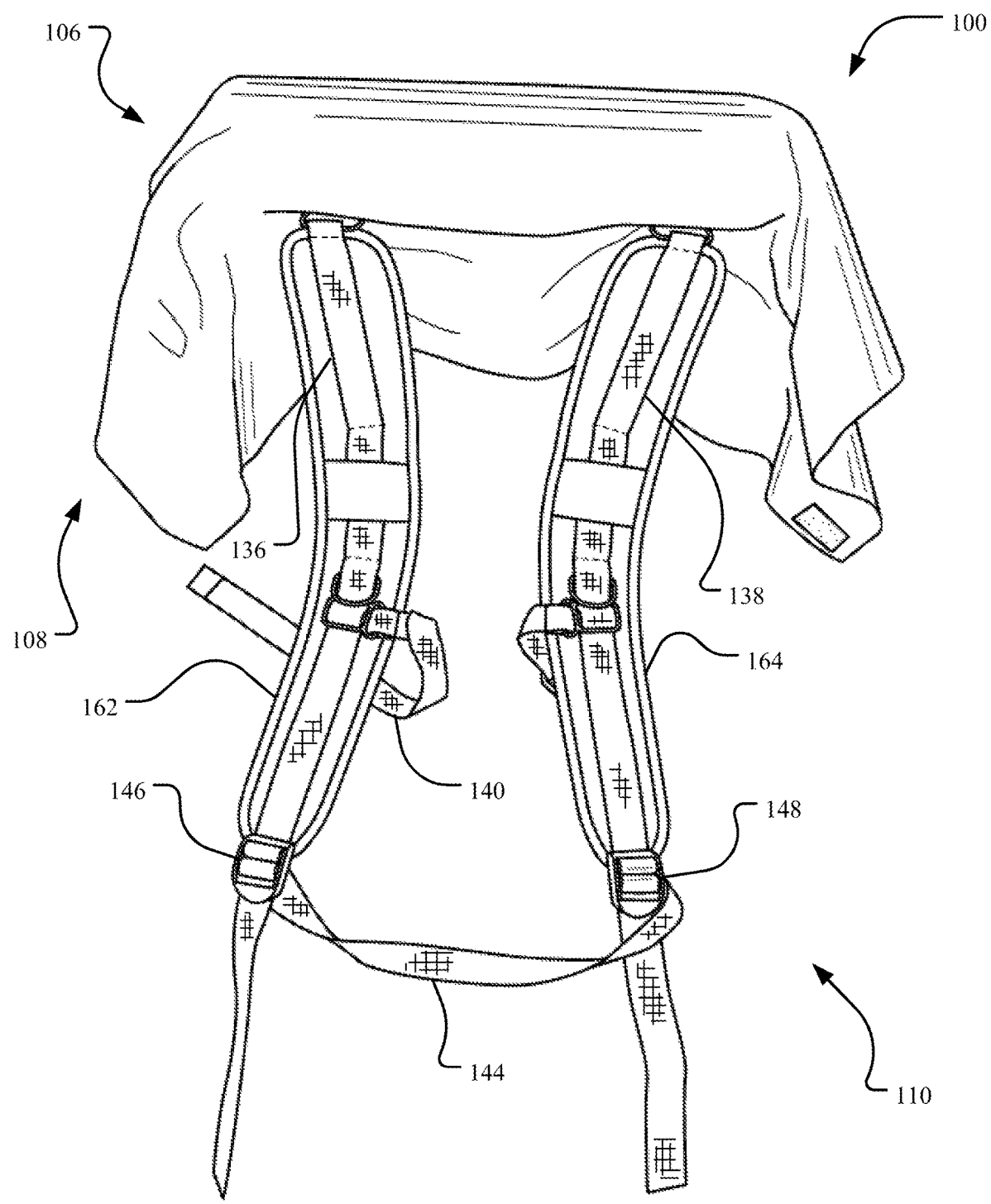
FIGS. 9 and 10 are a front view and a back view, respectively, of an example perch having strap pads.
Figure 10:
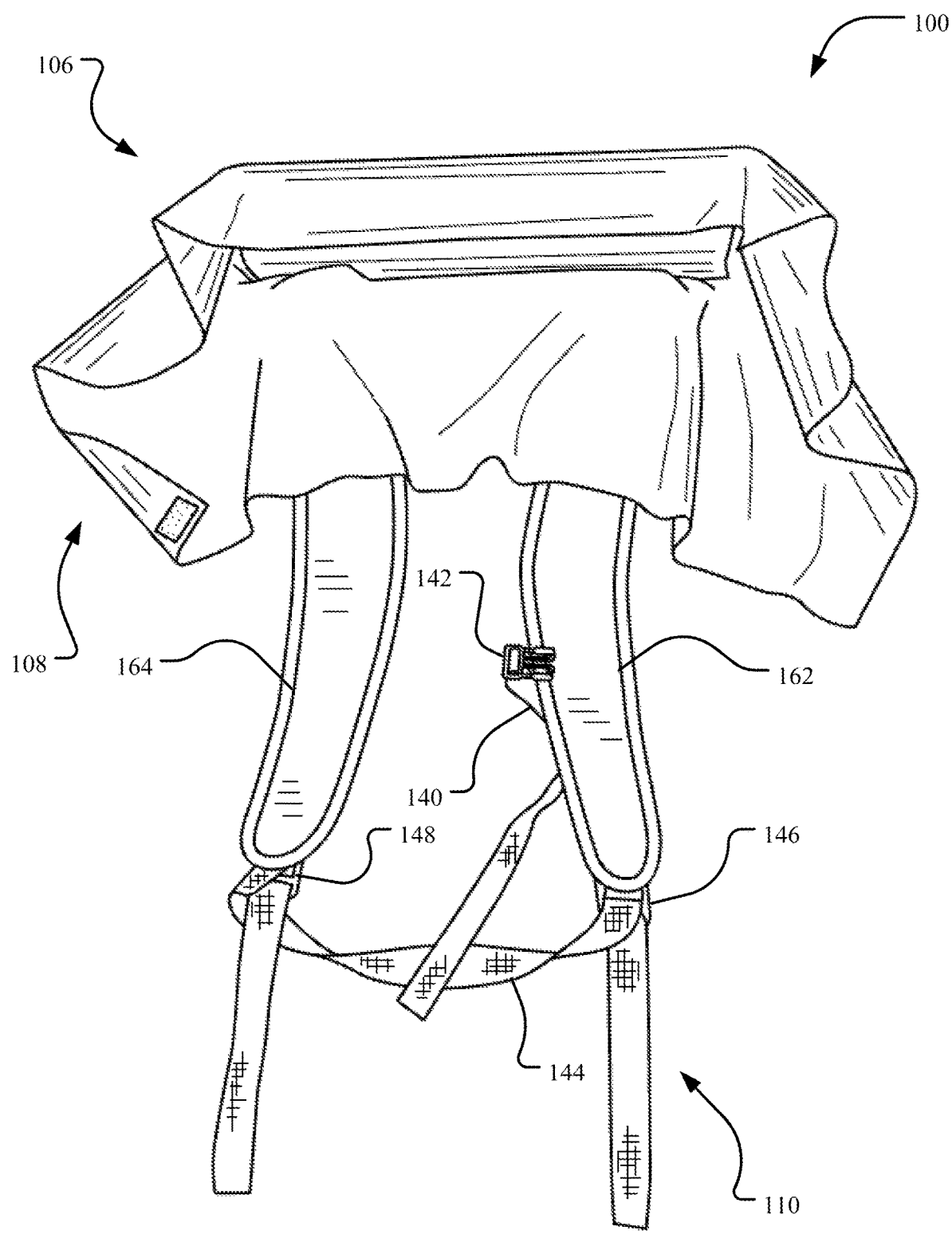

Referring to FIGS. 9-10, in one implementation, the first strap 136 includes a first strap pad 162 and the second strap 138 includes a second strap pad 164. The first strap pad 162 may be positioned behind the first strap 136, and the second strap 138 may be positioned behind the second strap 138 for enhanced comfort for the user 102.

Figure 11:
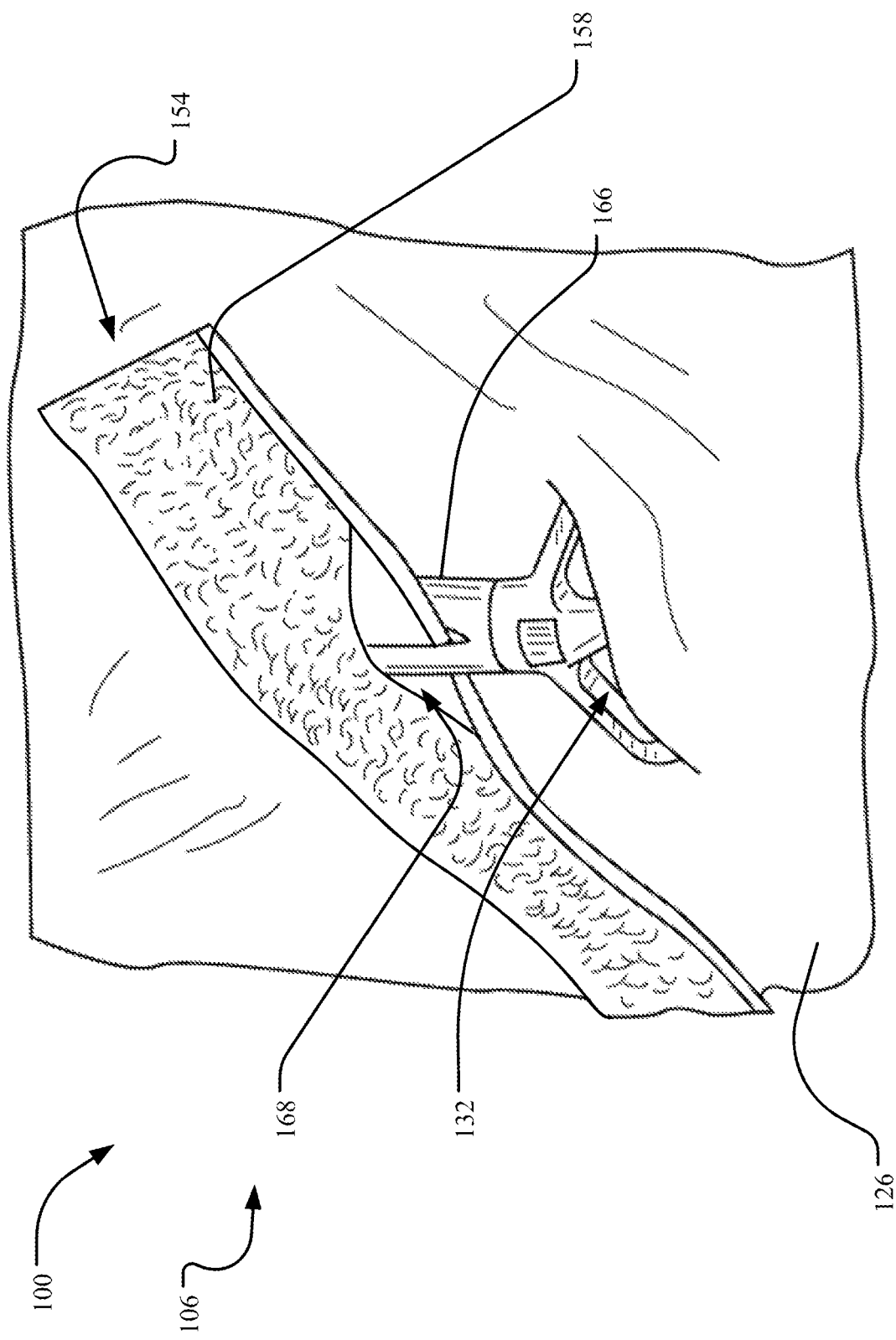
FIG. 11 depicts a detailed view of an example releasable strap connection.
Figure 12:
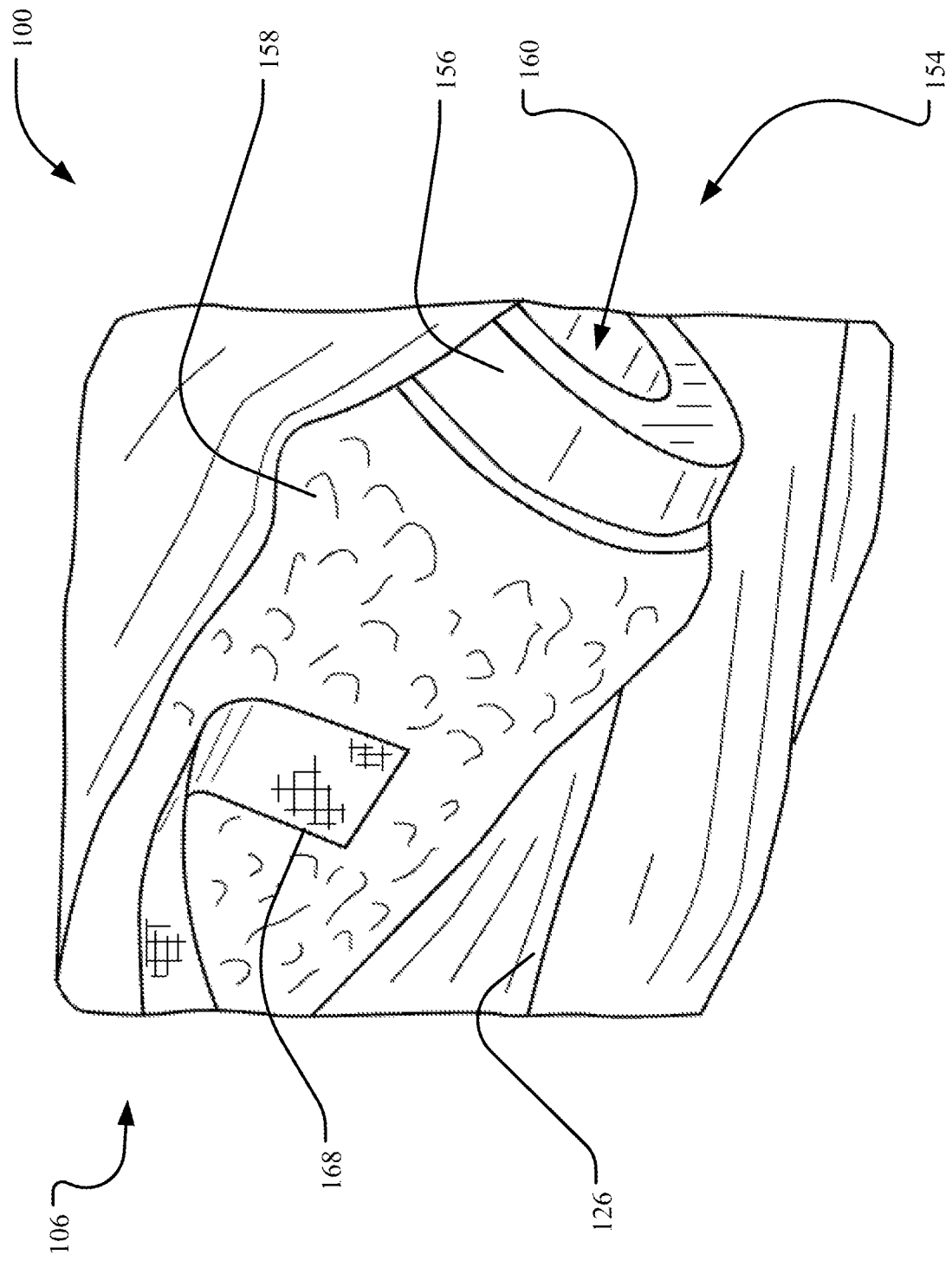
FIG. 12 shows a detailed view of an exampled fixed strap connection.

As described herein, the first strap 136 and the second strap 138 may be fixed or releasably connected to the core assembly 154. Turning to FIG. 11, in one implementation, the padded body 158 includes an opening 168 adapted to releasably receive and engage a connector 166 of one of the straps 136 or 138. The connector 166 may be a buckle, hook, clip, snap, and/or other releasable connectors. In another implementation shown in FIG. 12, each of the straps 136 and 138 are connected to the padded body 158 or other portion of the core assembly 154 with a fixed connection 168, such as stitching, adhesive, and/or the like.

Figure 13:
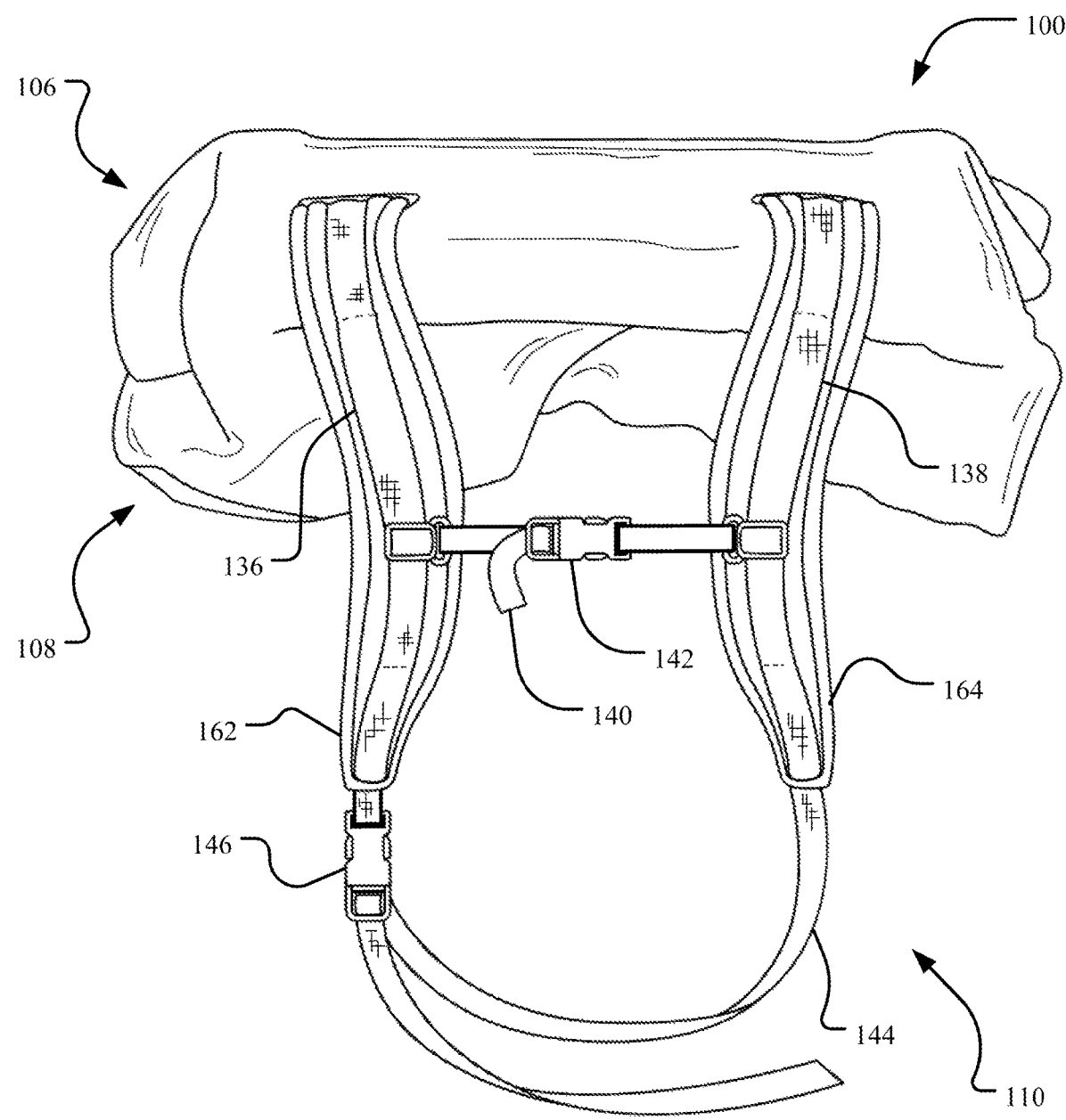
FIG. 13 is a front view of an example perch having an example releasable distal strap.

Turning to FIG. 13, in one implementation, the first strap 136 includes the first strap pad 162 and the second strap 138 includes the second strap pad 164. The first strap pad 162 may be positioned behind the first strap 136, and the second strap 138 may be positioned behind the second strap 138. The first strap 136 may be releasably connected to the distal strap 144 via the releasable connection 146 which may be, for example, a buckle. The distal strap 144 may also be adjustable via the releasable connection 146 for proper fitting of the distal strap 144 to the user. The distal strap 144 may be disconnected from the first strap 136 by the releasable connection 146 to facilitate installation and positioning of the perch 100 on the shoulder of the user. The distal strap 144 may be connected to the second strap 138 so that the distal strap 144 remains connected to the securing assembly 110 during installation and positioning of the perch 100.

Based upon design preferences, it is understood that the specific order or hierarchy of steps in the methods described herein can be rearranged while remaining within the disclosed subject matter. Any accompanying method claims present elements of the various steps in a sample order and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The above specification, examples, and data provide a complete description of the structure and use of example implementations of the invention. Various modifications and additions can be made to the exemplary implementations discussed without departing from the spirit and scope of the presently disclosed technology. For example, while the implementations described above refer to particular features, the scope of this disclosure also includes implementations having different combinations of features and implementations that do not include all of the described features. Accordingly, the scope of the presently disclosed technology is intended to embrace all such alternatives, modifications, and variations together with all equivalents thereof.

What is claimed is:

1. A pet perch for supporting a pet behind a neck of a user, the pet perch comprising:
   a bolster extending from a first end to a second end and defining a longitudinal axis, the bolster having a first end section, a middle section, and a second end section, wherein the middle section is disposed between the first end and the second end of the bolster, wherein the first end section extends from the first end to the middle section, wherein the second end section extends from the second end to the middle section; and
   a securing assembly configured to releasably secure the bolster to the user, the securing assembly including a first strap and a second strap, the first strap connected to the first end section of the bolster and extending therefrom, the second strap connected to the second end section of the bolster and extending therefrom,
   wherein the middle section of the bolster is positioned behind the neck of the user when the bolster is releasably secured to the user, wherein the longitudinal axis of the bolster is generally horizontal when the bolster is releasably secured to the user and a longitudinal axis of the user is generally vertical, wherein a top side of the bolster faces upwards when the bolster is secured to the user and the top side is configured to support the pet,
   wherein the first strap includes a first strap pad and the second strap includes a second strap pad, wherein at least a portion of the first strap pad is configured to contact a first shoulder of the user and at least a portion of the second strap pad is configured to contact a second shoulder of the user when the bolster is secured to the user.

2. The pet perch of claim 1, wherein the first strap and the second strap are each connected to the top side of the bolster.

3. The pet perch of claim 1, wherein the bolster comprises a core assembly having an elongated body extending from the first end to the second end of the bolster.

4. The pet perch of claim 3, wherein the first strap and the second strap are each fixedly connected to the elongated body.

5. The pet perch of claim 3, wherein the elongated body defines a shape comprising at least one of: cylindrical, conical, cubical, polygonal, pyramidal, ellipsoidal, spherical, curved, angled, or flat.

6. The pet perch of claim 3, wherein the core assembly comprises a padded body extending about the elongated body and extending from the first end to the second end of the bolster.

7. The pet perch of claim 6, wherein the first strap and the second strap are each fixedly connected to the padded body.

8. The pet perch of claim 6, wherein the padded body is integral with the elongated body.

9. The pet perch of claim 1, wherein at least a portion of the first strap is supported by a first shoulder of the user and at least a portion of the second strap is supported by a second shoulder of the user when the bolster is secured to the user.

10. The pet perch of claim 1, wherein the first strap is releasably connectable to the second strap via a releasable connection.

11. The pet perch of claim 1, further comprising a distal strap configured to extend across a back of the user, wherein the distal strap is connected to each of the first strap and the second strap, wherein at least a portion of the distal strap extends across the back of the user when the bolster is releasably secured to the user.

12. The pet perch of claim 11, wherein the distal strap is releasably connectable to the first strap, wherein a length of the distal strap is adjustable.

13. The pet perch of claim 1, further comprising a distal strap having a releasable connection, the distal strap configured to extend from the first strap to the second strap when the releasable connection is connected, wherein at least a portion of the distal strap extends across a back of the user when the bolster is releasably secured to the user and the releasable connection is connected.

14. The pet perch of claim 13, wherein the releasable connection includes a buckle, wherein a length defined by the first strap, the distal strap, and the second strap is adjustable via the buckle such that the length can be adjusted to securely fit across the back of the user.

15. The pet perch of claim 13, wherein the releasable connection is configured to be disconnected during positioning of the bolster, wherein the releasable connection is configured to be connected to releasably secure the bolster to the user.

16. The pet perch of claim 1, further comprising a proximal strap having a releasable connection, the proximal strap configured to extend from the first strap to the second strap when the releasable connection is connected, wherein at least a portion of the proximal strap extends across a chest of the user when the bolster is releasably secured to the user and the releasable connection is connected.

17. The pet perch of claim 1, further comprising a cover engaged to the bolster, wherein the cover includes a first opening and a second opening, the first strap of the securing assembly extending through the first opening and the second strap of the securing assembly extending through the second opening.

18. A pet perch for supporting a pet behind a neck of a user, the pet perch comprising:
a bolster extending from a first end to a second end, the bolster having a first end section, a middle section, and a second end section, wherein the middle section is disposed between the first end section and the second end section of the bolster;
a securing assembly configured to releasably secure the bolster to the user, the securing assembly including a first strap and a second strap, the first strap connected to the first end section of the bolster and extending therefrom, the second strap connected to the second end section of the bolster and extending therefrom; and
a distal strap configured to extend across a back of the user,
wherein the distal strap is connected to each of the first strap and the second strap, wherein at least a portion of the distal strap extends across the back of the user when the bolster is releasably secured to the user,
wherein the middle section of the bolster is positioned along a trapezii of the user and a top side of the bolster is configured to support the pet when the bolster is releasably secured to the user.

19. A pet perch for supporting a pet behind a neck of a user, the pet perch comprising:
a bolster extending from a first end to a second end and having a middle section between the first end and the second end; and
a securing assembly extending from the bolster and configured to releasably secure the bolster to the user with the middle section behind the neck of the user; and
a proximal strap having a releasable connection, the proximal strap configured to extend from a first strap to a second strap when the releasable connection is connected, wherein at least a portion of the proximal strap extends across a chest of the user when the bolster is releasably secured to the user and the releasable connection is connected,
wherein the bolster is in a generally horizontal orientation and a top side of the bolster is configured to support the pet when the bolster is secured to the user.

* * * * *